A. TEGOLI.
APPARATUS FOR DRYING AND THE LIKE.
APPLICATION FILED JUNE 20, 1916.
1,268,797.
Patented June 4, 1918.
4 SHEETS—SHEET 2.
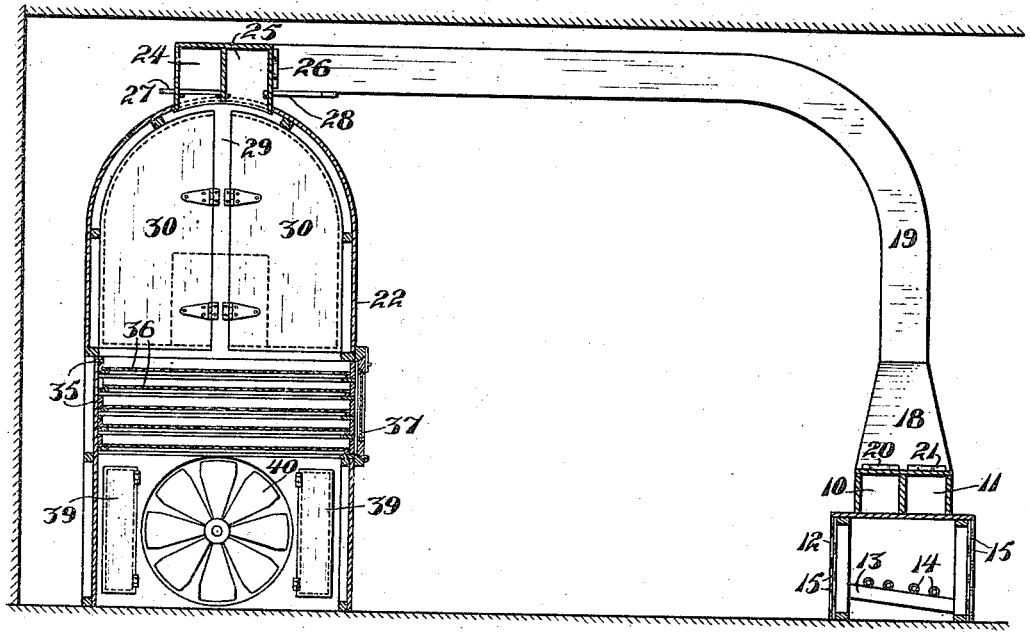
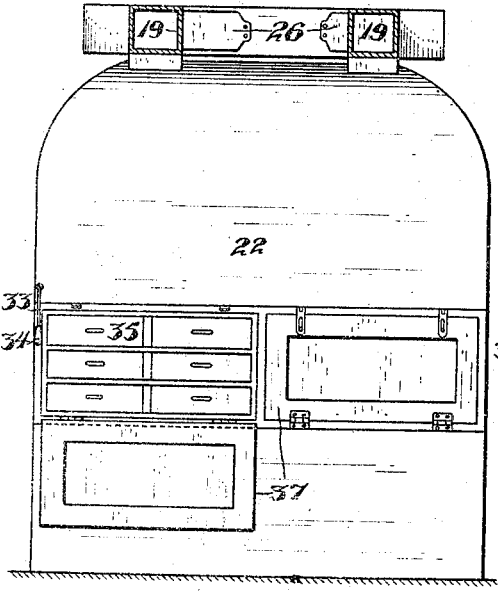
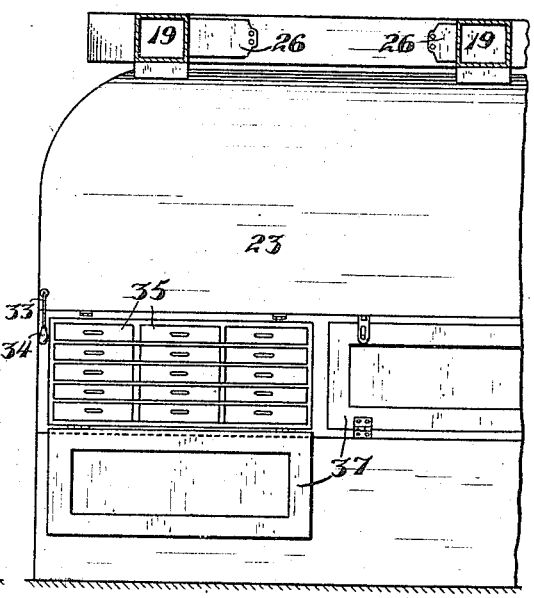
Inventor:
August Tegoli,
per F. M. Wright,
Attorney

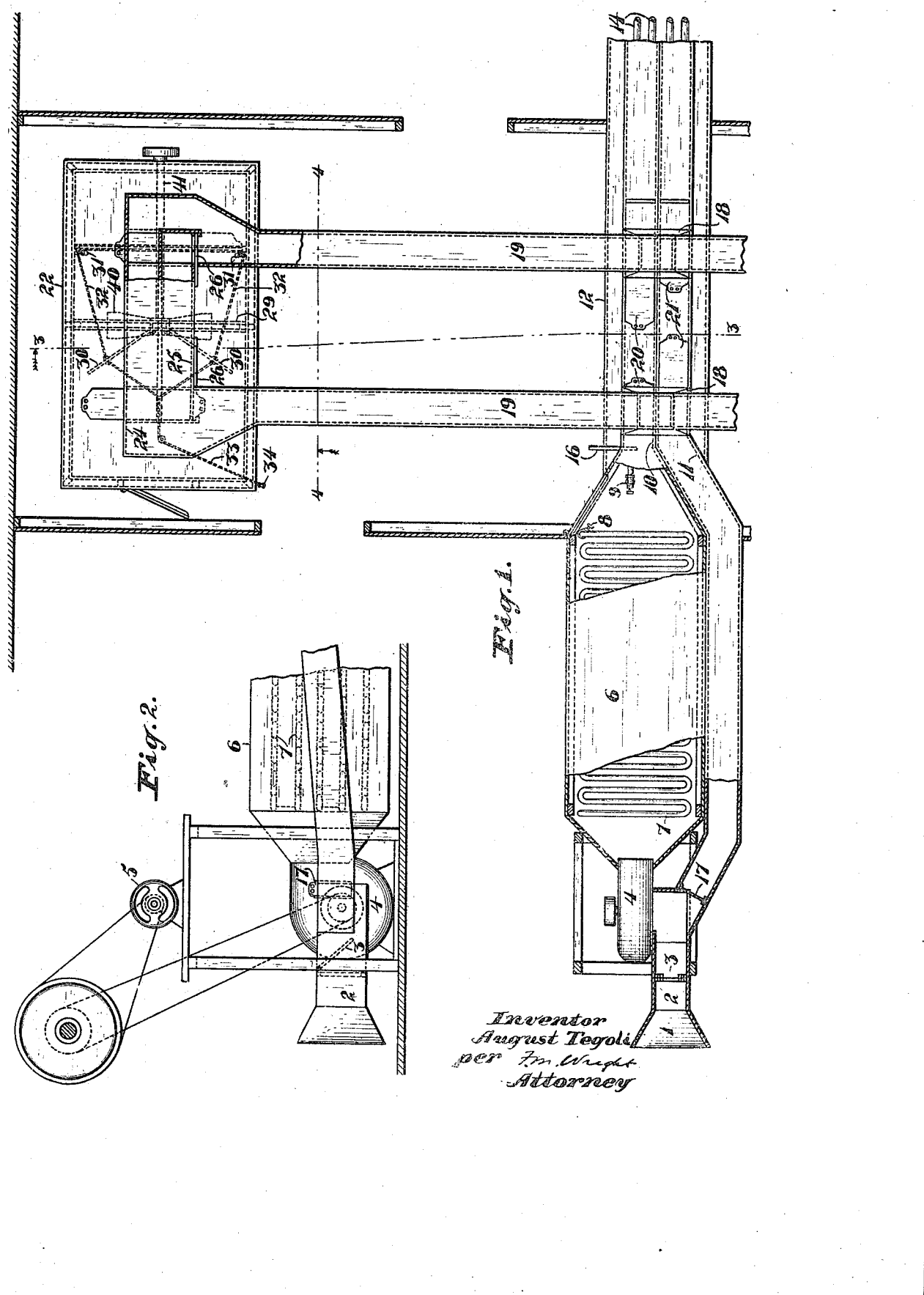

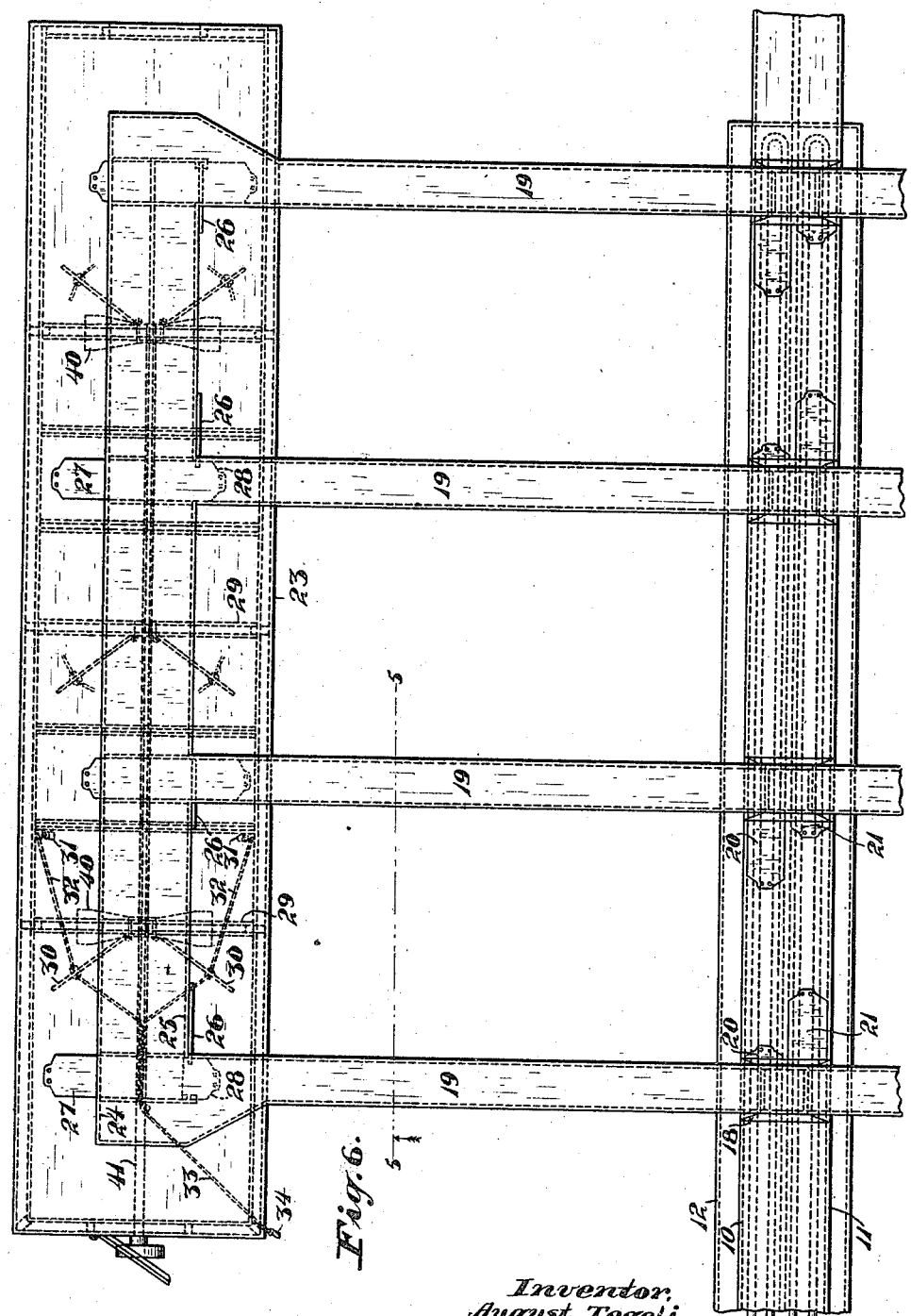

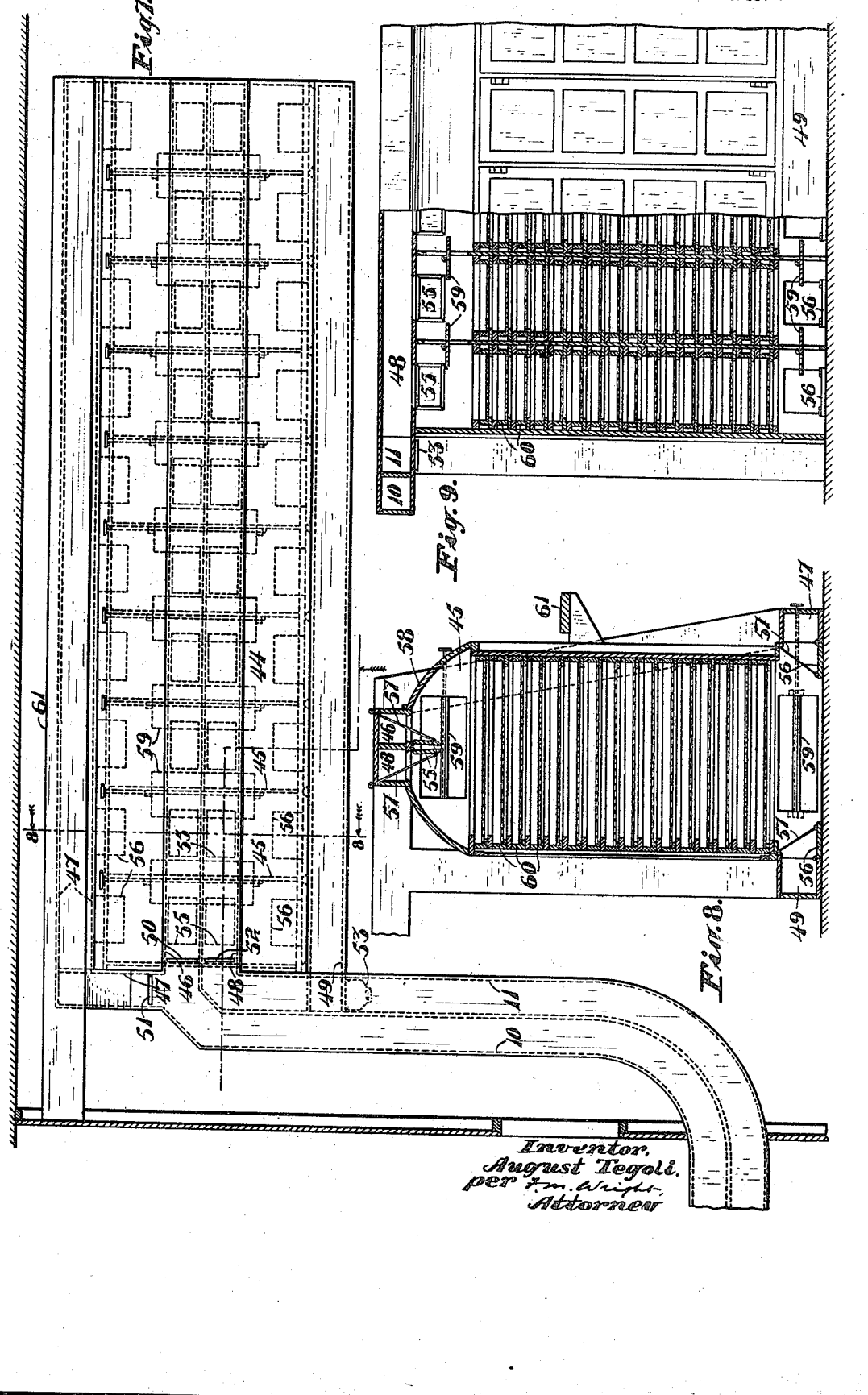

UNITED STATES PATENT OFFICE.

AUGUST TEGOLI, OF SAN FRANCISCO, CALIFORNIA.

APPARATUS FOR DRYING AND THE LIKE.

1,268,797. Specification of Letters Patent. Patented June 4, 1918.

Application filed June 20, 1916. Serial No. 104,739.

*To all whom it may concern:*

Be it known that I, AUGUST TEGOLI, a subject of the King of Italy, residing at San Francisco, in the county of San Francisco and State of California, have invented new and useful Improvements in Apparatus for Drying and the like, of which the following is a specification.

The present invention relates to apparatus for moving air into contact with material to be treated for the purpose of drying, moistening, curing, sterilizing, smoking, sulfuring, fumigating, disinfecting, or perfuming said material, according to the condition of said air or the substance with which the air may be impregnated, and the object of the invention is to provide such an apparatus which will greatly shorten the time required for treatment, and thus prevent injury caused by delay and improve qualities in the result, and which can quickly be varied or adjusted to vary the treatment as desired.

It is particularly adapted for treating cigars and tobacco of all kinds, but it is also useful for treating macaroni and kindred paste products, flowers, herbs, roots, fruits, vegetables, meats, fish, animal hair, feathers, wool, cotton and other fibers, woven fabrics, clothing, explosive and other powders, and many other products or materials.

In the accompanying drawings, Figure 1 is a broken plan view of my invention, showing therein one arrangement of drying or treating chamber; Fig. 2 is a partial side view of the same; Fig. 3 is a cross section on the line 3—3 of Fig. 1; Fig. 4 is a longitudinal section on the line 4—4 of Fig. 1; Fig. 5 is a similar section on the line 5—5 of Fig. 6; Fig. 6 is a plan view showing another arrangement of drying chamber; Fig. 7 is a broken plan view of still another arrangement of drying chamber Fig. 8 is a cross-sectional view of the same on the line 8—8 of Fig. 7; Fig. 9 is a broken side view of the same.

Referring to the drawings, 1 indicates the flaring mouth of a conduit 2, having therein a downwardly swinging check valve 3, and leading to a blower 4, rotated in either direction by a motor 5, and which may be run at different speeds to suit the work desired. By said blower air is drawn into said conduit 2 and impelled into a treating chamber 6, in which is a vertical series of horizontal coils of pipe 7, which are generally supplied with steam for heating purposes, but can also be used for cooling coils. The chamber may also be charged with perfumes or with smoke, sulfur, or other fumes, or with moisture as needed for the purpose required. The air emerging from said treating chamber passes into a duct 10, which, with a return duct 11, are supported on the top of a heat-transference chamber 12, in which extend, on a sloping support 13, longitudinal coils of pipe 14, generally used as steam pipe, the sides of the heat-transference chamber being formed of lattice work 15. Valves 8, 9 control the supply of steam to the pipes 7, 14. The inlet end of the duct 10 is regulated in size by a slide valve 16. The return duct 11 leads back to the conduit 2, a slide valve 17 controlling said return.

Communicating at suitable intervals with the tops of said ducts 10, 11, are enlarged lower portions 18 of ducts 19, said communications being controlled by slide valves 20, 21.

Said ducts 19 lead first vertically and then transversely each to a drier section, either on one or on both sides, the former only being here shown. Two of these ducts, nearer the blower, lead to a smaller drier 22, shown in Fig. 1, and four ducts lead to a larger drier 23 shown in Fig. 6. They communicate with said driers by means of distributing ducts 24, 25, extending longitudinally side by side, terminal transverse ducts 19 of each drier being enlarged at their forward ends to communicate with the distributing duct 24 remote from the ducts 10 and 11, and said terminal transverse ducts 19, as also the intermediate transverse ducts 19 for the larger drier 23, communicating with the nearer distributing duct 25 past slide valves 26. Said distributing ducts open downwardly past slide valves 27, 28 into the rounded tops of the driers 22 or 23, which are divided into sections by vertical partitions 29, said sections being arranged in pairs, the drier sections of each pair communicating with each other by openings closed by horizontally swinging doors 30, each door being closed by a weight 31 attached to a suitably guided cord 32 and opened by hand by means of a suitably guided cord 33 extending through a hole in a wall of the drier section and having attached to its outer end a handle 34. Below said doors 30 there are removably contained in each drier section interchangeable drawers 35, having wire screen bottoms 36, the front ends of the drawers, when closed, being covered by downwardly swinging doors 37, made as air-tight as possible. The air currents pass up or down through the wire screen bottoms 36, upon which are supported the goods to be treated. In the lower part of each partition are holes closed by doors 39 and also a round central hole, in which rotates a fan blower 40 on a longitudinally extending shaft 41, extending through one end of the drier and driven from any suitable source of power.

The drawers of the drier 22 having one pair of drier sections are preferably twice the depth of the drawers of the drier 23 having two pairs of sections, the drier 22 being adapted for a finishing process.

By suitably varying the speed of, or reversing, or stopping, the blower, or the fans, or by opening more or less, or closing, the slide valves 16, 17, 20, 21, 26, 27, 28, valves 9 and doors 30, 39, the mode of treatment of material is capable of being varied in a very great number of ways, any change in any one of the above elements having the effect of producing a different mode of treatment of the goods.

As shown in Fig. 7, the ducts 10 and 11 are extended and communicate with a third drier 44 consisting of sections 45, said ducts 10, 11 rising to a level above the tops of the sections. The duct 10 communicates with two branch ducts 46 and 47, and the duct 11 communicates with two branch ducts 48 and 49, the ducts 46 and 48 extending longitudinally side by side on the tops of the several drier sections 45, and the ducts 47 and 49 extending on opposite sides of the drier, first downwardly, and then horizontally and longitudinally, close to the sides of the drier. Slide valves 50, 51, 52, 53 can close the entrance to the ducts 46, 47, 48, 49 respectively. The ducts 46, 48, at the top, and the ducts 47, 49, at the bottom, communicate with the several sections 45 through doors 55, 56, respectively, all of said doors being operated by cords 57. The upper part of each drier section is rounded, and access is had to the interior thereof by means of a door 58, and the drier sections communicate with each other at top and bottom through damper doors 59. In the intermediate parts of the several sections there are contained horizontally movable drawers 60 having wire bottoms. A raised footboard 61 extends along the back of the drier.

The system of driers, ducts and the like here illustrated may be reduced in size and simplified in arrangement to suit smaller work, or may be extended and amplified by adding sections to any one or more driers, or by placing driers on both sides of the main ducts, to suit more extended work, and still retain its essential features, the number of combinations being diminished or increased in proportion.

The different driers may be used for successive stages in the treatment of the same goods, or they may be used for different goods at the same time, provided that no injurious effect results from the simultaneous operation.

By suitably varying the positions of any or all of the slide valves 50, 51, 52 and 53 and doors 55, 56 and 59, a large variety of movements of the air through the several sections 45, and therefore of treatment of the goods, can be obtained, and this may be accomplished with certain goods and by using certain agents even while the blower and fans are at rest.

The cigars or other goods to be treated, as for instance, to be dried, are placed in the drawers 35 and air is forced through said drawers in succession by means of the apparatus above described, and their moisture is rapidly extracted from the cigars and carried off by the return duct and discharged into the atmosphere.

I claim:—

1. The combination of a blower, a treating chamber communicating with said blower, a coil of pipe therein, a duct communicating with said treating chamber, a return duct, drier sections communicating with each other and with which said ducts communicate, valves controlling said communication, and means, in each section, for supporting material in an exposed condition.

2. The combination of a blower, a treating chamber communicating with said blower, a coil of pipe therein, a duct communicating with said treating chamber, a return duct, drier sections communicating with each other and with which said ducts communicate, valves controlling said communications, and, in each section, drawers having apertured bottoms.

3. The combination of a blower, a treating chamber communicating with said blower, a coil of pipe therein, a duct communicating with said treating chamber, a return duct, drier sections communicating with each other and with which said ducts communicate, valves controlling said communications, and, in each section, interchangeable drawers having apertured bottoms.

4. The combination of a blower, a treating chamber communicating with said blower, a coil of pipe therein, a duct communicating with said treating chamber, a return duct, drier sections communicating with each other and with which said ducts can communicate, means for controlling said communications, rotary fans in the communications between the sections, and means, in each section, for supporting material in an exposed condition.

5. The combination of a treating chamber, a coil of pipe therein, a duct communicating with said treating chamber, an exhaust duct, drier sections communicating with each other and with which said ducts can communicate, means for controlling said communications, rotary fans in the communications between the sections, and means, in each section, for supporting material in an exposed condition.

6. The combination of a blower, a treating chamber communicating with said blower, a coil of pipe therein, a duct communicating with said treating chamber, a return duct, drier sections with which said ducts communicate, valves controlling said communications, adjacent drier sections communicating with each other in pairs, rotary fans in said latter communications, and means in each section, for supporting material in an exposed condition.

7. The combination of a treating chamber, a coil of pipe therein, a duct communicating with said treating chamber, an exhaust duct, drier sections with which said ducts communicate, valves controlling said communications, adjacent drier sections communicating with each other in pairs, rotary fans in said latter communications, and means, in each section, for supporting the material in an exposed condition.

8. The combination of a blower, a treating chamber communicating with said blower, a coil of pipe therein, a duct communicating with said treating chamber, a return duct, drier sections with which said ducts communicate, valves controlling said communications, adjacent drier sections communicating with each other in pairs, doors controlling certain of said latter communications, rotary fans in other communications thereof, and means, in each section, for supporting the material in an exposed condition.

9. The combination of a treating chamber, a coil of pipe therein, a duct communicating with said treating chamber, an exhaust duct, drier sections with which said ducts communicate, valves controlling said communications, adjacent drier sections communicating with each other in pairs, doors controlling certain of said latter communications, rotary fans in other communications thereof, and means, in each section, for supporting material in an exposed condition.

10. The combination of a blower, a treating chamber communicating with said blower, a coil of pipe therein, a duct communicating with said treating chamber, a return duct, means whereby said return duct may communicate either with the outside atmosphere or with the blower, transverse ducts having portions communicating with said first-named ducts, valves controlling said communications, distributing ducts with which said transverse ducts communicate, valves controlling said last-named communications, drier sections with which said distributing ducts communicate, valves controlling said communications, adjacent drier sections communicating with each other in pairs, doors controlling certain of said latter communications, rotary fans in other communications thereof, and means, in each section, for supporting material in an exposed condition.

11. The combination of a blower, rotatable in either direction, a treating chamber communicating with said blower, a coil of pipe therein, a heat transference chamber having open sides, a duct supported by said heat transference chamber and communicating with said treating chamber, a return duct also supported by said heat transference chamber, means whereby said return duct may communicate either with the outside atmosphere or with the blower, transverse ducts having lower portions communicating with said first-named ducts, valves controlling said communications, longitudinally extending distributing ducts with which said transverse ducts communicate, valves controlling said last-named communications, drier sections with which said distributing ducts communicate, valves controlling said communications, adjacent drier sections communicating with each other in pairs, doors controlling certain of said latter communications, rotary fans in other communications thereof, and means, in each section, for supporting material in an exposed condition.

12. The combination of a treating chamber, a coil of pipe therein, a duct communicating with said treating chamber, a return duct, drier sections communicating with each other and with which said ducts communicate, valves controlling said communication, means, in each section, for supporting material in an exposed condition, and means for maintaining circulation of a treating agent in the treating chamber.

AUGUST TEGOLI.

Copies of this patent may be obtained for five cents each, by addressing the "Commissioner of Patents, Washington, D. C."